May 5, 1959
J. W. BROWNING
2,885,216
TRAILER WITH ELEVATABLE CHASSIS
Filed Nov. 2, 1956
2 Sheets-Sheet 1
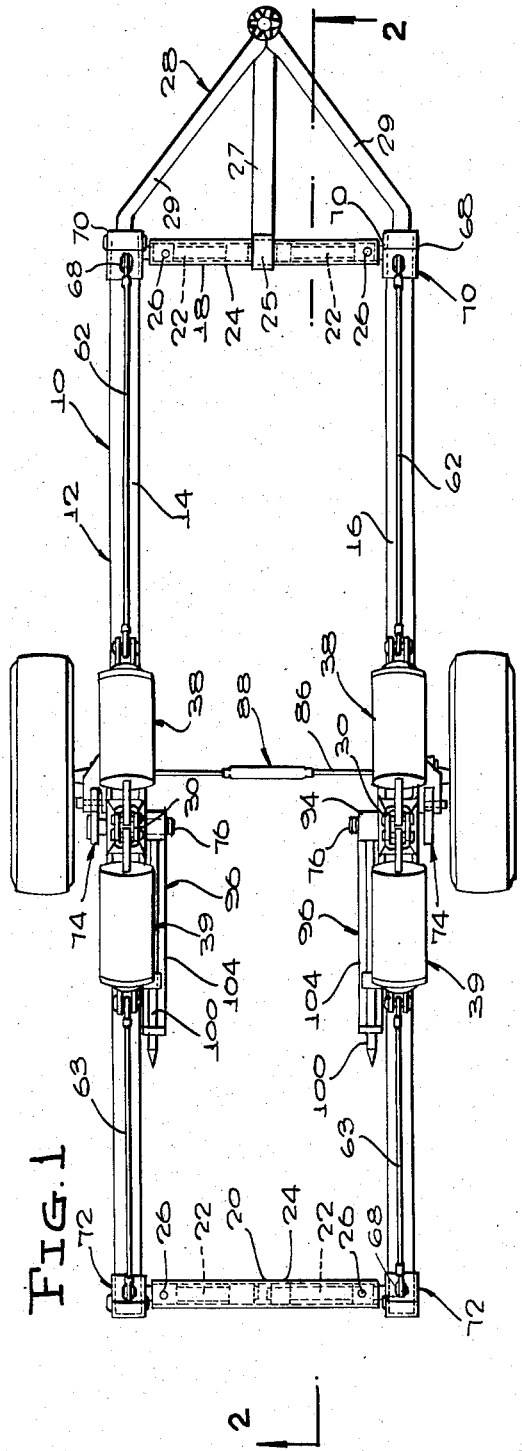
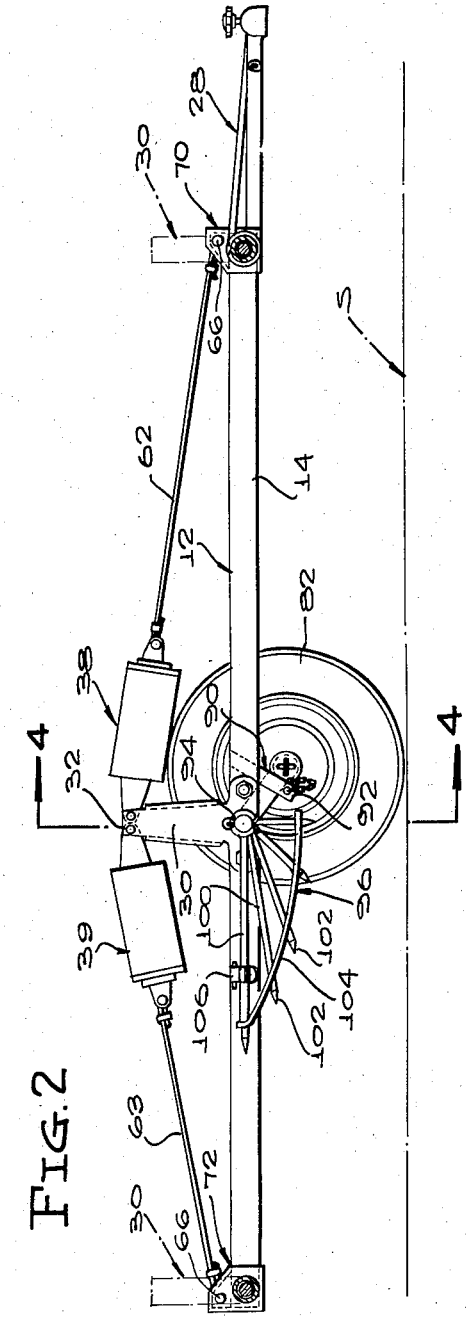
INVENTOR.
JAMES W. BROWNING
BY
McMorrow, Berman & Davidson
ATTORNEYS May 5, 1959

J. W. BROWNING 2,885,216

TRAILER WITH ELEVATABLE CHASSIS

Filed Nov. 2, 1956

INVENTOR.
JAMES W. BROWNING
BY
McMorrow, Berman & Davidson
ATTORNEYS

United States Patent Office 2,885,216
Patented May 5, 1959

2,885,216

TRAILER WITH ELEVATABLE CHASSIS

James W. Browning, McKinney, Tex., assignor of one-half to Melvin B. Swanner, Sherman, Tex.

Application November 2, 1956, Serial No. 620,118

2 Claims. (Cl. 280—44)

This invention relates to an improved two-wheel trailer of the type wherein the chassis frame can be lowered from a normal load carrying height to a depressed loading and unloading level.

The primary object of the invention is to provide a more practical and efficient trailer of this kind, which is easy and positive in action, and which is composed of minimum number of simple parts which are easily assembled, and replaced when necessary.

Another object of the invention is to provide a trailer of the character indicated which includes means for absorbing bending shocks to the chassis frame of the trailer during transit of the trailer.

A further object of the invention is to provide a trailer of the character indicated which is readily and economically manufactured, easily used and maintained, and is highly satisfactory and practical for the purpose intended.

These together with other objects and advantages which will become apparent reside in the details of construction and operation as more fully hereinafter described and claimed, reference being had to the accompanying drawings forming a part hereof, wherein like numerals refer to like parts throughout, and in which:

Figure 1 is a top plan view of a trailer in accordance with the present invention.

Figure 2 is a vertical longitudinal section taken substantially on the line 2—2 of Figure 1, showing the chassis frame in a normal elevated position.

Figure 5:
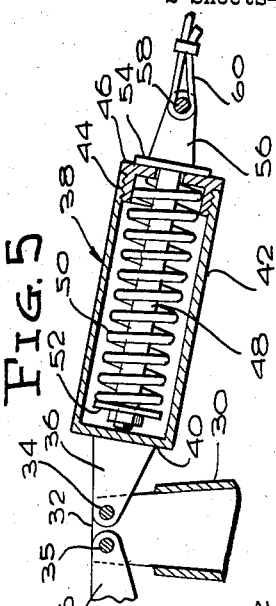
Figure 5 is a fragmentary enlarged vertical longitudinal section taken substantially on line 5—5 of Figure 4.

Referring to the drawings in detail, the illustrated trailer, generally designated 10, comprises a horizontal chassis frame 12 involving a pair of elongated spaced parallel side members 14 and 16 of any suitable character, spaced and connected at their forward and rear ends by cross members 18 and 20. The cross members 18 and 20 are telescopic, to enable the side members 14 and 16 to be adjusted toward and away from each other for changing the effective width of the frame 12. The cross members 18 and 20 comprise stub shafts 22 on and projecting inwardly from the side members 14 and 16, having their inward ends slidably engaged in the opposite ends of sleeves 24. Extending transversely through opposite ends of the sleeves 24 are suitable set screws 26, engageable with the stub shafts 22.

Secured to the forward end of the frame 12 is a drawbar structure 28 preferably composed of forwardly converging side bars 29 secured to the forward ends of the frame side members and secured at their forward ends to a central bar 27 which in turn is secured to the forward cross member 18, as indicated at 25.

Figure 4:
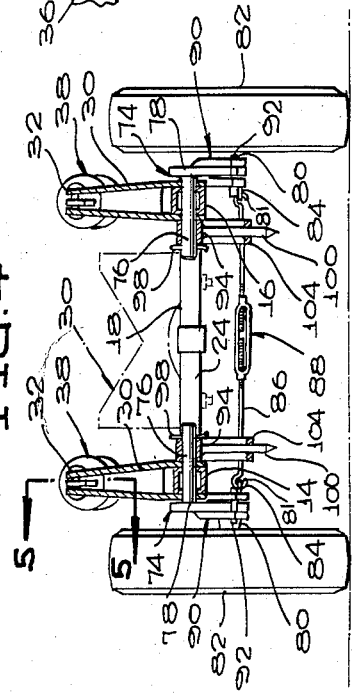
Figure 4 is a vertical section taken substantially on the line 4—4 of Figure 2.

Mounted on and rising from the frame side members 14 and 16 at a point displaced rearwardly from the midpoint of the frame 12 are fixed standards 30 having bifurcated upper end portions indicated at 32, see Figure 4. The bifurcated upper end portions 32 have extending transversely thereacross front and rear pivots 34 and 35 having pivotally journaled thereon the connecting ears 36 of forward and rear shock absorber assemblies indicated generally at 38 and 39. The ears 36 extend longitudinally from the adjacent closed ends 40 of cylinders 42, Figure 5, which have open threaded ends 44 receiving apertured removable plugs 46. Working through the plugs 46 are rods 48 having circumposed thereon compression springs 50 having one end thereof engaged with abutment portions 52 on one end of the rods 48 within the cylinders 42. The other ends of said springs are in engagement with the inner surface of the plugs 46. The rods 48 have thereon exteriorly of the plugs 46 abutment collars 56 having thereon a pair of spaced ears 56 traversed by a pin 58. Circumposed about the pins 57 are the looped inner ends 60 of flexible cables 62 and 63, whose outer ends have loops 64 circumposed about pins 66 extending between pairs of vertically extending ears 68 on brackets 70 and 72 secured on the forward and rear ends of the frame side members 14 and 16. Downward flexing of the ends of the frame 12 are yieldably arrested by and cushioned by the shock absorbers, and such downward flexions are limited to safe limits.

Indicated generally at 74 are bell cranks which incorporate horizontal crank pins 76 which are journaled through the frame side members 14 and 16 and through lower portions of the standards 30, the crank pins 76 being in axial alignment with each other. On the laterally outward ends of the crank pins 76 and disposed at the outer sides of the side members 14 and 16, Figure 4, are depending crank arms 78 which have suitably secured on their lower ends laterally outwardly projecting stub axles 80 on which ground-engaging wheels 82 are journaled and are positioned outside of the frame side members 14 and 16. Thus, the frame 12 can be moved vertically and horizontally in an arcuate path for raising and lowering said frame from the elevated position shown in Figure 2 to the depressed loading and unloading position shown in Figure 3 and subsequently back to the elevated position shown in phantom lines in Figure 3. In the inward ends of the stub axles 80 are hooks 84 engaged by the hooked ends 81 of a tie rod 86 incorporating a turnbuckle assembly indicated generally at 88. The turnbuckle assembly accommodates adjustment of width of the frame i.e. the transverse distance between the side members 14 and 16.

Secured in any suitable manner and depending from the frame side members 14 and 16 forwardly of the axes of the crank pins 76 and disposed in the path of rotation of the crank arms 78 are pairs of laterally spaced retaining lugs, indicated generally at 90, Figure 4, arranged to receive therebetween intermediate portions of the crank arms 78. The lugs 90 are traversed at their lower portions by removable stop pins 92, which are engageable behind the crank arms 78 for retaining the frame 12 in the elevated position shown in Figure 2. Journaled on the crank pins 76 at the inner sides of the standards 30 are journals 94 of jacks, indicated generally at 96, the journals 94 being retained in place by means such as cotter pins 98. Each jack 96 comprises a plurality of rods 100 radiating from the journal 94 and of increasing lengths from front to rear, and having pointed lower ends 102. A curved plate 104 extends between and is secured to the rods 100 near their points 102, Figure 2.

Figure 3:
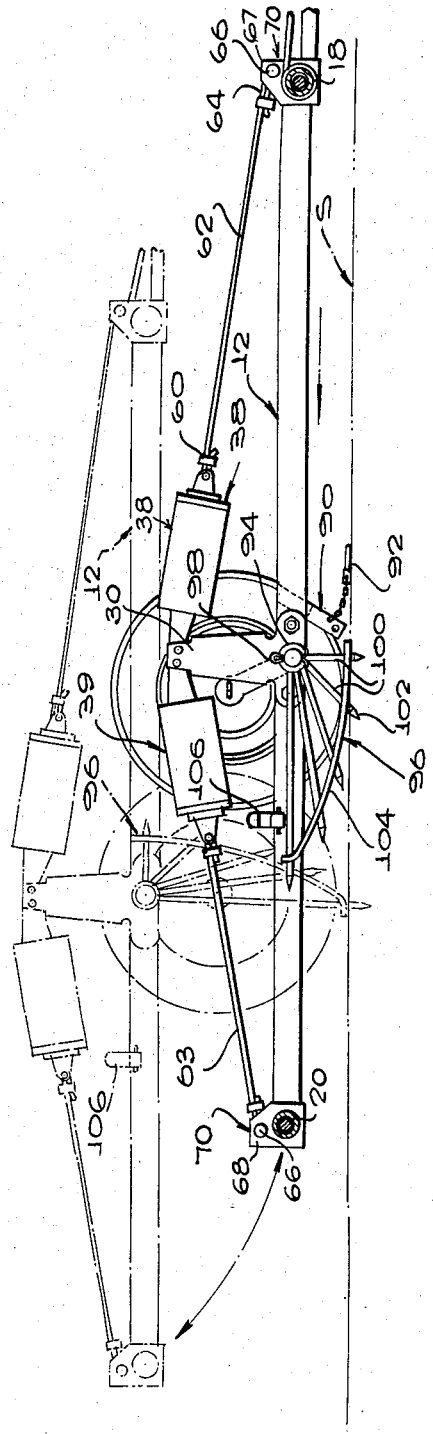
Figure 3 is a view similar to Figure 2, showing the frame lowered to depressed loading and unloading position, showing in phantom lines the manner in which the frame may be elevated.

In Figures 2 and 3, the trailer frame 12 is shown in an elevated position, with the rearmost rod of the jacks 96 releasably secured in clip elements 106 on the inward sides of the frame side members retaining the jacks 96 in raised positions away from the ground. When it is desired to lower the frame 12 to the depressed position shown in Figure 3, the jacks 96 are disengaged from the clips 106 and permitted to pivot downwardly about the crank pins 76 to approximately the forwardly swung position shown in phantom lines in Figure 3. The trailer 10 is then backed up, and the rear end of the frame 12 is slightly raised, the longest jack rod being engaged with the ground. This enables the stop pins 92 to be removed so as to free the crank arms 78 from the pins of lugs 90. A forward pull on the trailer 10, as by means of a suitable draft vehicle, results in rotation of the frame 12 about the wheel stub axles 80 and the crank pins 76 to the depressed position shown in full lines in Figure 3, so that such as a boat, can be easily removed from or moved onto the frame 12. When it is desired to raise the frame 12 from its depressed position, movement in a rearward direction of the frame 12 will cause upward and rearward swinging of the frame 12 on the stub axles 80 and the crank pins 76, until the frame reaches the elevated phantom line position shown in Figure 3, with the crank arms 78 disposed between the pairs of lugs 90, whereat the stop pins 92 can be reinserted to hold the position of the frame. While the frame 12 is being raised or lowered the turnbuckle tie rod 86 is removed.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is:

1. In a trailer, a horizontal chassis frame having spaced side members having forward and rear ends, bell cranks having horizontal crank pins journaled through said side members at points intermediate the ends of the side members, said crank pins being axially aligned with each other across said frame, said crank pins having laterally inward and laterally outward ends, depending crank arms on the laterally outward ends of the crank pins and located outside of said frame side members, said crank arms having lower ends having laterally outwardly projecting stub axles thereon, ground-engaging wheels journaled on said stub axles and located outside of said frame side members, fixed lug means on and depending from said side members at points forwardly of the axes of said crank pins, said lug means being in the path of downwardly and forward movement of said crank arms as the chassis frame assumes an elevated load carrying position, stop pins removably traversing said lug means and engaging behind the crank arms to retain the elevated position of the chassis frame, and jacks comprising journals circumposed on the said laterally inward ends of the crank pins inwardly of the frame side members, and ground-engaging means on and depending from said journals having a curved ground-engaging plate which is eccentric to the axes of the crank pins.

2. In a trailer, a horizontal chassis frame having spaced side members having forward and rear ends, bell cranks having horizontal crank pins journaled through said side members at points intermediate the ends of the side members, said crank pins being axially aligned with each other across said frame, said crank pins having laterally inward and laterally outward ends, depending crank arms on the laterally outward ends of the crank pins and located outside of said frame side members, said crank arms having lower ends having laterally outwardly projecting stub axles therein, ground-engaging wheels journaled on said stub axles and located outside of said frame side members, fixed lug means on and depending from said side members at points forwardly of the axes of said crank pins, said lug means being in the path of downwardly and forward movement of said crank arms as the chassis frame assumes an elevated load carrying position, stop pins removably traversing said lug means and engaging behind the crank arms to retain the elevated position of the chassis frame, and jacks comprising journals circumposed on the said laterally inward ends of the crank pins inwardly of the frame side members, and ground-engaging means on and depending from said journals having a curved ground-engaging plate which is eccentric to the axes of the crank pins, said ground engaging means comprising a plurality of rods radiating from each journal, the rods increasing in length from front to rear of the chassis frame, said rods having pointed lower ends, and said plate extending between and being secured to the rods near their lower ends.

References Cited in the file of this patent

UNITED STATES PATENTS

| | | |
|---|---|---|
| 1,453,954 | Scholtes | May 1, 1923 |
| 1,512,472 | Leipert | Oct. 21, 1924 |
| 1,946,984 | Nicholson | Feb. 13, 1934 |
| 2,174,415 | Curtis | Sept. 26, 1939 |
| 2,355,663 | McGlothlin | Aug. 15, 1944 |
| 2,475,716 | Nabors | July 12, 1949 |
| 2,487,701 | Getz | Nov. 8, 1949 |
| 2,743,936 | Bigge | May 1, 1956 |
| 2,774,606 | Burweger et al. | Dec. 18, 1956 |
| 2,780,473 | Harrison | Feb. 5, 1957 |
| 2,780,475 | Koerner | Feb. 5, 1957 |

FOREIGN PATENTS

| | | |
|---|---|---|
| 673,351 | France | Jan. 14, 1930 |